Patented Dec. 26, 1939

2,184,622

UNITED STATES PATENT OFFICE 2,184,622

MANUFACTURE OF TANNING AGENTS

Gustav Mauthe and Hermann Noerr, Opladen, near Cologne, Germany, assignors to I. G. Farbenindustrie Aktiengesellschaft, Frankfort-on-the-Main, Germany No Drawing. Application May 5, 1938, Serial No. 206,226. In Germany May 13, 1937

5 Claims. (Cl. 149—4.1)

The present invention relates to a process for the manufacture of tanning agents.

It is known to prepare tanning agents by treating lignin sulfonic compounds, especially sulfite cellulose waste liquor, with polynuclear aromatic hydroxy compounds soluble or dispersible therein; these products can be employed as substitutes for vegetable tanning agents.

In accordance with our invention the properties of such tanning agents may be further improved by splitting off, in the course of their manufacture, sulfurous acid from the lignin sulfonic compound or sulfite cellulose waste liquor without, however, forming insoluble compounds. The products thus obtained in many cases display a better solubility and an improved tanning action; for instance the tanning may be performed with a more neutral reaction of the tanning liquor than with the known agents.

It has also been proposed to treat sulfite cellulose waste liquor with caustic soda, lime or ammonia in which processes sulfurous acid was split off; according to another method, sulfite cellulose waste liquor is heated with phenol in an alkaline solution under such conditions that sulfurous acid is split off. However, our process of treating sulfite cellulose waste liquor with polynuclear aromatic hydroxy compounds and also splitting off sulfurous acid, is novel; the products thus obtained are superior to those prepared according to hitherto known methods as regards tanning and filling capacity.

As starting materials for our process the usual worked-up thickened waste sulfite cellulose liquors or lignin sulfonic compounds isolated therefrom come into question, for instance liquors from pine-wood or beechwood cellulose. The liquors may be purified and freed from ash. Splitting off of the sulfurous acid in accordance with our invention is suitably performed in an aqueous medium at elevated temperatures, if desired under pressure and preferably in the presence of alkalies. For instance, the sulfite cellulose waste liquor is boiled with caustic soda lye or heated under pressure with aqueous ammonia. The concentration of the alkalies employed may vary within wide limits; depending on the concentration, more or less sulfurous acid is split off. Accordingly the resulting products show somewhat different tanning properties: if, for instance, small quantities of sulfurous acid have been split off, they are less sensitive towards the acidity of the hide and act quickly and thoroughly thereon whereas splitting off of much sulfurous acid results in products of milder tanning action but which tan with a less acid reaction of the liquor.

The process of our invention may be carried out by treating the sulfite cellulose waste liquor in any suitable way, for instance by boiling it with alkali lyes and thereby splitting off sulfurous acid, whereupon the solution is caused to react with polynuclear aromatic hydroxy compounds. Both the treatments may also be carried out in one and the same step, but care must be taken that a sufficient excess of alkali is present in order to split off sulfurous acid. When the sulfite cellulose waste liquor has been pretreated in an alkaline medium the aromatic compounds are added preferably at an alkaline reaction. The mass thus obtained is homogenized and by adding acid the reaction products are salted out and at the same time sulfurous acid is set free. Salting out may be assisted by addition of neutral salts.

In this manner viscous to solid masses are obtained which are plastic in the hot and show a considerably better solubility and stability on heating when compared with corresponding products from sulfite cellulose waste liquor which has not been treated in an alkaline medium. A further improvement as regards the solubility, stability on heating and tanning action may be achieved in some cases by a subsequent treatment of the products with aldehydes, especially formaldehyde, at elevated temperatures.

As polynuclear aromatic compounds with phenolic hydroxyl groups which come into consideration for the present process there may be mentioned, for instance, the condensation products of aromatic hydroxy compounds and reagents known to be capable of linking aromatic nuclei, for instance, the primary condensation products of phenols and formaldehyde or sulfur or sulfur chloride, dihydroxydiarylsulfones and so on. The polynuclear products to be used can also be formed in the reaction mixture, for instance by adding phenol and formaldehyde to a solution of sulfite cellulose waste liquor pretreated with alkali. Sulfonated polynuclear aromatic hydroxy compounds may also be employed, although it is to be recommended to use only part of the aromatic compounds in this form.

The following examples illustrate our invention, the parts being by weight.

*Example 1*

188 parts of sulfite cellulose waste liquor (35° Bé., pH 7.4) are heated to 120° C. for 3 hours in a closed vessel with 22 parts of caustic soda lye (38° Bé.) while stirring. After cooling to about 60° C. there are added 33 parts of a condensation product which has been prepared in the following manner:

94 parts of phenol are boiled with
50 parts of commercial formaldehyde
200 parts of water and
3 parts of hydrochloric acid while stirring and under reflux until the formaldehyde odor has disappeared. The reaction product is then separated from water.

The reaction mass thus obtained is treated in the hot while stirring with hydrochloric acid; a resinous water soluble product precipitates. In order to remove the sulfurous acid split off by the alkaline treatment and which would disturb the tanning process, the mixture is made acid to Congo red, air being passed through at the same time. The reaction product may be washed once more with 20% its weight of warm water in order to remove inorganic salts. The product is of good solubility in water and yields good leathers in a weakly acid liquor.

Example 2

188 parts of commercial purified sulfite cellulose waste liquor of about 34-35° Bé. are maintained at about 125° C. for 3 hours with 10 parts of aqueous ammonia (commercial, about 20%) in an autoclave. After cooling the reaction product is mixed with 28 parts of a resin which has been obtained in the following manner:

94 parts of phenol are mixed with
23 parts of chloracetone and kept for some time at a temperature of about 100° C. until no more hydrochloric acid is evolved. A viscous mass is thus formed which is miscible with the sulfite waste liquor in the hot.

By adding hydrochloric acid the reaction products is salted out. It yields on diluting with water clear solutions; at a pH of the tanning liquor of 4.6 well filled leathers are obtained.

Example 3

188 parts of sulfite cellulose waste liquor (35° Bé.) are heated under pressure at 115° C. for 1 hour with 12 parts of caustic soda lye (38° Bé.). After cooling 18 parts of a resin are added, prepared by heating 108 parts of cresol and 40 parts of $\alpha,\beta$-dichlordiethylether to 95-100° C. until the formation of hydrochloric acid is finished. The product is worked up as described in Example 1.

Example 4

188 parts of sulfite cellulose waste liquor (35° Bé.) are boiled with 15 parts of caustic soda for 3 hours. Thereupon, 25 parts of a resin are added which has been prepared in the following manner:

80 parts of sulfur monochloride are added drop by drop at 70° C. to
94 parts of phenol and the mixture is kept at this temperature until the formation of hydrochloric acid is finished.

After having added the said quantity of resin to the boiled sulfite waste liquor it is acidified with hydrochloric acid until the reaction is acid to Congo red. In order to remove the sulfurous acid formed by the alkaline treatment, air is passed through the mixture in the hot. The reaction product which is a solid mass plastic in the hot is washed with 20% of its weight of water in order to remove the salts. The product thus obtained is used for tanning purposes at a pH of about 4.

Example 5

188 parts of sulfite cellulose waste liquor (35° Bé.) are heated with 18 parts of caustic soda lye (38° Bé.) at 115° C. for 1 hour. The reaction mass is then heated with 35 parts of dioxydiphenylsulfone and 13 parts of formaldehyde at 95-100° C. until the formaldehyde is consumed. Thereupon it is acidified with hydrochloric acid until the reaction has turned acid to Congo red, the reaction mass forming a solid and a liquid phase. The solid reaction product which essentially comprises the tanning agent is washed with some water in order to remove the neutral salts until a diluted sample shows a pH of about 4.

Example 6

188 parts of sulfite cellulose waste liquor (35° Bé.) are heated with 15 parts of caustic soda lye (38° Bé.) at 115° C. for 1½ hours. After cooling 27.5 parts of the acid resin obtained from phenol and formaldehyde according to Example 1, and 3 parts of formaldehyde are added and the mixture is kept at a temperature of 95-100° C. until no more formaldehyde can be detected in the mixture. Then it is acidified with hydrochloric acid to a pH of 3; the precipitated reaction product is washed with water in the hot in order to remove the salts. When using the reaction product as tanning agent at a pH of 4 there are obtained leathers which are equivalent or similar in character to such from a tanning carried out with weakly sulfited quebracho extract.

Example 7

188 parts of commercial purified sulfite cellulose waste liquor (35° Bé.) are boiled with 13 parts of caustic soda for 5 hours. After cooling 15 parts of a resin are added which has been obtained by boiling 100 parts of crude cresol, 40 parts of commercial formaldehyde, 200 parts of water and 3 parts of commercial hydrochloric acid until the formaldehyde odor has disappeared. The mixture is made acid to Congo red by adding hydrochloric acid while stirring; thereby a viscous resin is precipitated in the hot which can be diluted with water (1:2) yielding a clear syrup. 100 parts of this solution are used for tanning at a pH=4 together with 100 parts of a product obtained according to Example 1 of our copending application Ser. No. 114,364, filed December 5, 1936 now U. S. Patent 2,177,420 issued October 24, 1939.

Example 8

188 parts of commercial purified sulfite cellulose waste liquor (35° Bé.) are heated under pressure with 6 parts of caustic soda at 115° C. for 1 hour. After cooling to about 80° C., 30 parts of a resin are added which has been obtained by acid condensation from 1 mol of cresol, 1 mol of phenol and 1 mol of formaldehyde. The solution is mixed with 2.5 parts of formaldehyde and heated at 95-100° C. until the formaldehyde odor has disappeared, and is then acidified with hydrochloric acid until the reaction has turned acid to Congo red; in order to remove the sulfurous acid air is passed through. The reaction product which is solid in the cold and viscous in the hot is washed with 20% of its weight of warm water in order to remove the neutral salts and the excess acid. The product thus obtained can be dissolved with water in all proportions and can be employed for tanning purposes at a pH of about 4.5.

*Example 9*

1920 parts of sulfite cellulose waste liquor (35° Bé.) are boiled for 2 hours with
150 parts of caustic soda. Subsequently an anhydrous resin is added at a temperature of 60° C. which has been prepared in the following manner;
216 parts of crude cresol are heated to boiling with
400 parts of water
80 parts of commercial formaldehyde (30%) and
6 parts of commercial hydrochloric acid while stirring the mixture.

When the formaldehyde has disappeared the reaction product is separated from water.

After the mixture of the sulfite cellulose waste liquor and resin has become homogeneous the solution is made acid to Congo red while stirring by adding 700 parts of commercial hydrochloric acid, whereby considerable quantities of sulfurous acid are set free. In order to remove the latter completely, air is passed through.

The resinous mass thus formed is separated from the precipitated salt-containing liquor by kneading and is washed with 300 parts of a 10 per cent ammonium sulfate solution. 1100 parts of the product are dissolved in an equal quantity of water. Thereupon the solution is stirred into a reaction mass obtained by sulfonating 770 parts of the following resin with 308 parts sulfuric acid monohydrate. The resin is prepared in the following manner:

40 parts of phenol
210 parts of crude cresol
400 parts of water
135 parts of commercial formaldehyde (30%)
0.8 part of commercial hydrochloric acid are heated to boiling until the formaldehyde is consumed. Subsequently the main quantity of the water is removed and the resin dried in vacuo.

45 parts of commercial formaldehyde diluted with an equal amount of water are added at 50° C. to a mixture consisting of the above sulfonated resin and the reaction product of sulfite cellulose waste liquor described at the beginning of this example. Stirring is continued until no more formaldehyde can be detected. Subsequently the mixture is neutralized with ammonia until the reaction is weakly acid to Congo red and, if desired, acidified with small quantities of acetic acid. Tanning can be performed at a pH of about 4.

*Example 10*

188 parts of purified sulfite cellulose liquor (35° Bé.) of the trade are mixed with 35 parts of caustic soda lye (35° Bé.) and heated during about 1½ hours to 100° C. To this mixture there are added 25 parts of a resin prepared by heating 400 parts of phenol, 100 parts of grape sugar and 20 parts of hydrochloric acid. The resin is added at about 60° C. while stirring. It is taken up by the mixture homogeneously within a short time. Thereupon aqueous sulfuric acid is added until the pH of the mixture is about 3.5. After cooling the mixture separates into 2 layers. In order to facilitate the separation of the solid layer which contains the main part of the tanning substances 20 parts of ammonium sulfate are added.

The reaction product so obtained which is solid in the cold and highly viscous at higher temperatures can be diluted with water and can be used for tanning preferably at a pH of from 3.5-4.5.

*Example 11*

188 parts of sulfite cellulose waste liquor (35° Bé.) are heated together with 12 parts of caustic soda for 1 hour to a temperature of 90° C. Thereupon 15 parts of the phenolformaldehyde resin prepared as described in Example 1 are added. Within a short time the resin is homogeneously incorporated with the alkaline mixture. Thereupon diluted aqueous sulfuric acid (about 40%) is added until the pH is about 3.5-4. The mass separates into 2 layers. One layer which is solid in the cold contains the tanning substances which yield with warm or cold water clear solutions. The product can be used as such for preparing leathers or in combination with vegetable tanning extracts or synthetic tanning agents.

*Example 12*

188 parts of sulfite cellulose liquor (35° Bé., pH=7.4) are boiled for 3 hours with caustic soda lye (35° Bé.). After cooling for about 60° C., 33 parts of the phenol-formaldehyde resin prepared as described in Example 1 are added. Into the resulting mixture aqueous sulfuric acid is stirred at about 60° C. A resinous water soluble product separates. In order to remove the sulfurous acid formed during the alkaline treatment which might be harmful when the product is subsequently used for tanning, air is passed through the mixture for some time. Furthermore, in order to remove inorganic salts, the product may be washed with 20% its weight of warm water. The product yields with water clear solutions which are less viscous than the solutions of the tanning product obtained in Example 1. The product may be used as such or in combination with vegetable or synthetic tanning agents; moreover, it might be employed for pretreating or aftertreating leathers which are tanned with mineral salts, for instance, chrome salt.

I claim:

1. In the process of manufacturing tanning substances by treating a lignin sulfonic compound with an unsulfonated condensation product, being soluble or dispersible therein, of an aromatic hydroxy compound and an agent known to be capable of linking aromatic nuclei, selected from the group consisting of organic compounds, sulfur, sulfur halogen compounds and sulfuric acid, the modification which comprises treating the lignin sulfonic compound in the course of this manufacture with an alkali at elevated temperature, whereby a substantial amount of sulfurous acid is split off from the lignin sulfonic compound, without forming insoluble compounds.

2. In the process of manufacturing tanning substances by treating a sulfite cellulose waste liquor with an unsulfonated condensation product, being soluble or dispersible therein, of an aromatic hydroxy compound and an agent known to be capable of linking aromatic nuclei, selected from the group consisting of organic compounds, sulfur, sulfur halogen compounds and sulfuric acid, the modification which comprises treating the sulfite cellulose waste liquor in the course of this manufacture with an alkali at elevated temperature whereby a substantial amount of sulfurous acid is split off from the sulfite cellulose waste liquor, without forming insoluble compounds.

3. In a process according to claim 2 first treating the sulfite cellulose waste liquor with the alkali and thereupon incorporating the condensation product therewith.

4. A process of manufacturing tanning substances by heating an alkaline mixture of sulfite cellulose waste liquor and of an unsulfonated condensation product, being soluble or dispersible therein, of an aromatic hydroxy compound and an agent known to be capable of linking aromatic nuclei, selected from the group consisting of organic compounds, sulfur, sulfur halogen compounds and sulfuric acid, sufficient alkali being present in the mixture in order to cause splitting off of sulfurous acid from the sulfite cellulose waste liquor, and stopping the heating before insoluble compounds are formed.

5. A process of manufacturing tanning substances by treating sulfite cellulose waste liquor with hot alkali lye, thereby splitting off sulfurous acid, but without forming insoluble compounds, and incorporating with the liquor so treated an unsulfonated condensation product, being soluble or dispersible therein, of an aromatic hydroxy compound and an agent known to be capable of linking aromatic nuclei, selected from the group consisting of organic compounds, sulfur, sulfur halogen compounds and sulfuric acid, and formaldehyde, and heating the mixture so obtained.

GUSTAV MAUTHE.
HERMANN NOERR.